United States Patent
Heino et al.

(10) Patent No.: US 11,418,542 B2
(45) Date of Patent: Aug. 16, 2022

(54) IDENTIFICATION OF UNKNOWN TRAFFIC BASED ON TRANSPORT LAYER SECURITY EXTENSIONS

(71) Applicant: Forcepoint LLC, Austin, TX (US)

(72) Inventors: Jenny Anniina Heino, Espoo (FI); Tuomo Syvanne, Espoo (FI); Welf Christian Jalio, Espoo (FI); Olli-Pekka Niemi, Espoo (FI)

(73) Assignee: FORCEPOINT LLC, Austin, TX (US)

( * ) Notice: Subject to any disclaimer, the term of this patent is extended or adjusted under 35 U.S.C. 154(b) by 161 days.

(21) Appl. No.: 16/750,499

(22) Filed: Jan. 23, 2020

(65) Prior Publication Data

US 2021/0234895 A1 Jul. 29, 2021

(51) Int. Cl.
*H04L 9/40* (2022.01)
*H04L 67/14* (2022.01)

(52) U.S. Cl.
CPC .......... *H04L 63/166* (2013.01); *H04L 63/18* (2013.01); *H04L 63/20* (2013.01); *H04L 67/14* (2013.01)

(58) Field of Classification Search
CPC ....... H04L 63/18; H04L 63/20; H04L 63/166; H04L 67/14
USPC ........................................................ 713/151
See application file for complete search history.

(56) References Cited

U.S. PATENT DOCUMENTS

| 8,683,052 | B1 | 3/2014 | Brinskelle | |
|---|---|---|---|---|
| 9,172,545 | B2 | 10/2015 | Edstrom et al. | |
| 9,203,627 | B2 | 12/2015 | Edstrom et al. | |
| 10,003,616 | B2 | 6/2018 | Buruganahalli et al. | |
| 10,212,224 | B2 | 2/2019 | Kjendal et al. | |
| 2008/0162924 | A1* | 7/2008 | Chinitz | H04L 63/20 713/153 |
| 2017/0302703 | A1* | 10/2017 | Buruganahalli | H04L 63/06 |
| 2017/0310703 | A1 | 10/2017 | Ackerman et al. | |
| 2018/0324153 | A1* | 11/2018 | Althouse | H04L 63/0876 |
| 2019/0379720 | A1* | 12/2019 | Yu | H04L 67/42 |

FOREIGN PATENT DOCUMENTS

| AU | 2009203095 B2 | 8/2009 |
|---|---|---|
| AU | 2010208551 B2 | 8/2010 |
| EP | 1229443 | 8/2002 |
| TW | I623205 B | 5/2018 |

OTHER PUBLICATIONS

Network Working Group Request for Comments: 5246 The Transport Layer Security (TLS) Protocol Version 1.2 https://datatracker.ietf.org/doc/html/rfc5246 T. Dierks; E. Rescorla; Aug. 2008 (Year: 2008).*
ALPN Explained https://www.keycdn.com/support/alpn Oct. 4, 2018 (Year: 2018).*

* cited by examiner

*Primary Examiner* — Benjamin A Kaplan
(74) *Attorney, Agent, or Firm* — Jackson Walker LLP; Christopher J. Rourk

(57) ABSTRACT

A system for providing network data processing, comprising a processor operating one of more algorithms that are configured to interface with one or more clients to receive a client hello data message. A transport layer security extension extraction system operating on the processor and configured to extract an extension from the client hello data message. A transport layer security extension identification system operating on the processor and configured to process the extension from the client hello data message and to identify a data networking session using the extension.

20 Claims, 3 Drawing Sheets

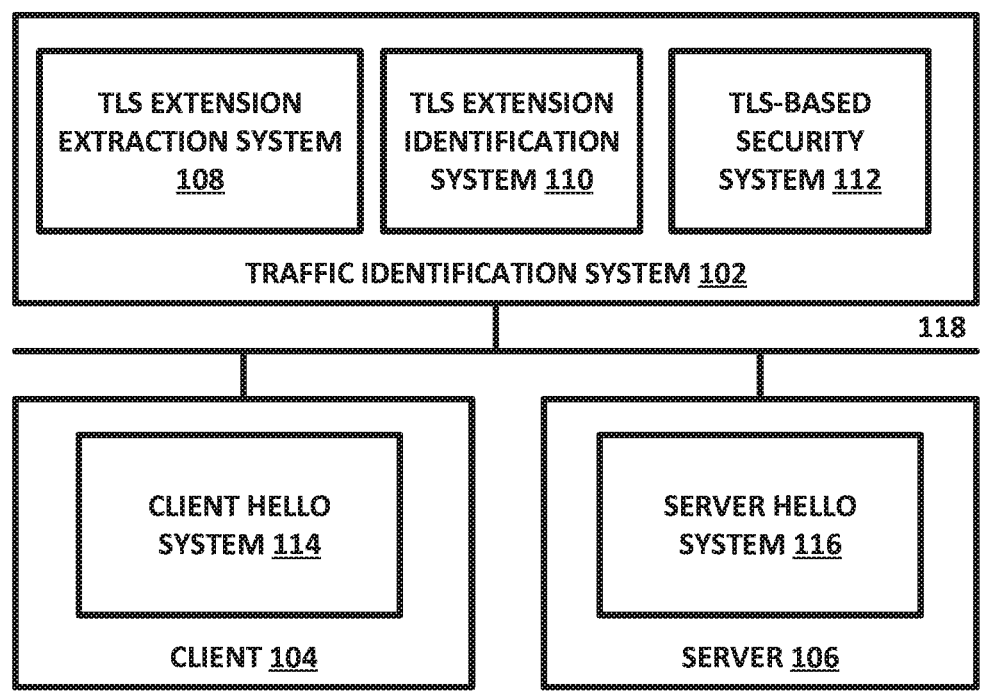
FIGURE 1      100 

IDENTIFICATION OF UNKNOWN TRAFFIC BASED ON TRANSPORT LAYER SECURITY EXTENSIONS

TECHNICAL FIELD

The present disclosure relates generally to data network security, and more specifically to a system and method for providing improved identification of unknown traffic based on Transport Layer Security (TLS) extensions.

BACKGROUND OF THE INVENTION

Identifying a data networking session is important, but can be difficult if a client is interfacing with a server that is hidden by an associated server. These network services providers can be exploited by hostile third parties, and tracking a specific session can be impossible in these and other configurations.

SUMMARY OF THE INVENTION

A system for providing network data processing is disclosed that includes a processor operating one of more algorithms that are configured to interface with one or more clients to receive a client hello data message, such as a firewall system. A transport layer security extension extraction system operating on the processor is configured to extract an extension from the client hello data message, and a transport layer security extension identification system operating on the processor is configured to process the extension from the client hello data message and to identify a data networking session using the extension. In this manner, a data networking session that was previously unable to be identified can now be identified.

Other systems, methods, features, and advantages of the present disclosure will be or become apparent to one with skill in the art upon examination of the following drawings and detailed description. It is intended that all such additional systems, methods, features, and advantages be included within this description, be within the scope of the present disclosure, and be protected by the accompanying claims.

BRIEF DESCRIPTION OF THE SEVERAL VIEWS OF THE DRAWINGS

Aspects of the disclosure can be better understood with reference to the following drawings. The components in the drawings may be to scale, but emphasis is placed upon clearly illustrating the principles of the present disclosure. Moreover, in the drawings, like reference numerals designate corresponding parts throughout the several views, and in which:

FIG. 1 is a diagram of a system for identifying unknown traffic based on TLS extensions, in accordance with an example embodiment of the present disclosure;

DETAILED DESCRIPTION OF THE INVENTION

Figure 2:
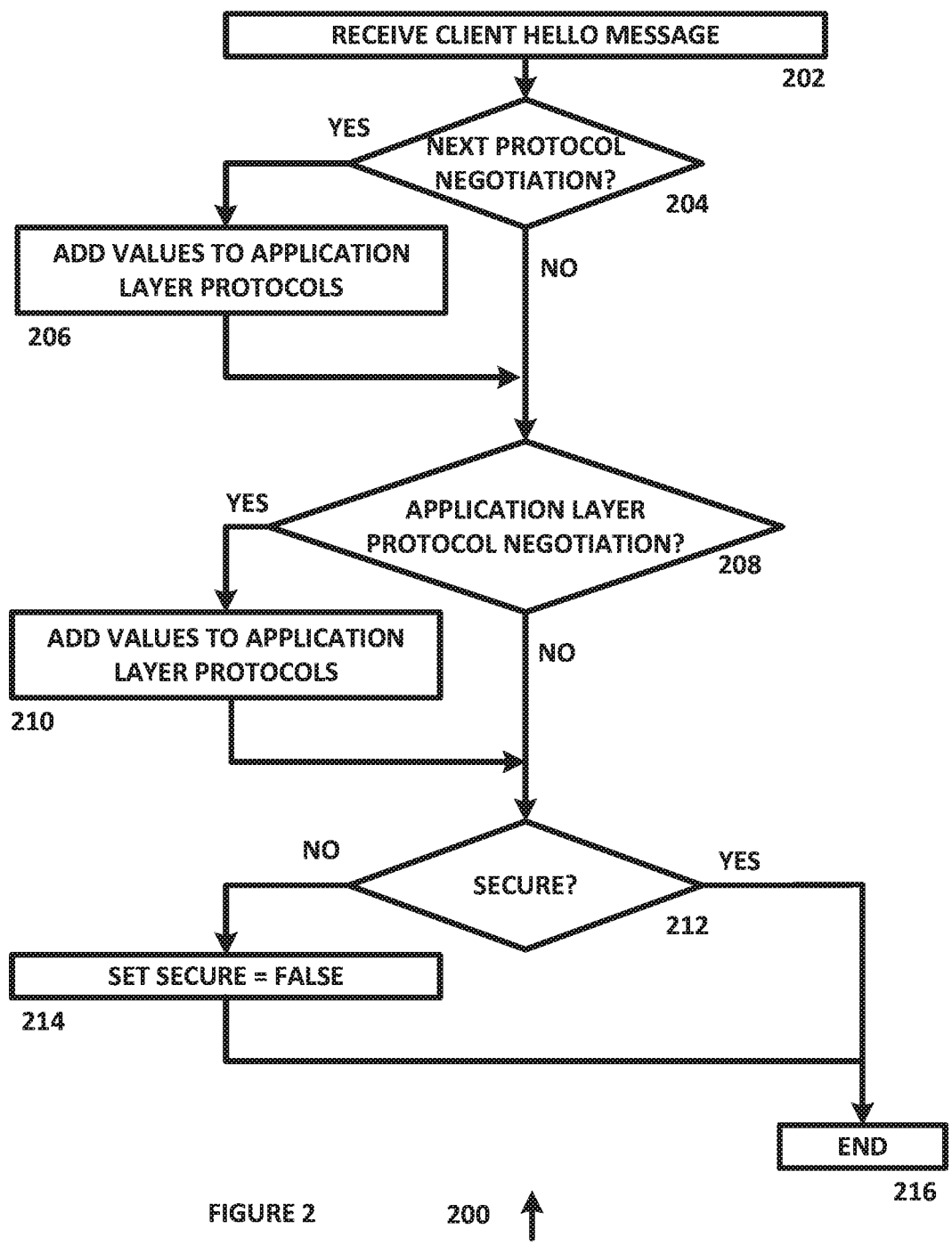
FIG. 2 is a diagram of an algorithm for identifying unknown traffic based on a response to a client hello, in accordance with an example embodiment of the present disclosure.

In the description that follows, like parts are marked throughout the specification and drawings with the same reference numerals. The drawing figures may be to scale and certain components can be shown in generalized or schematic form and identified by commercial designations in the interest of clarity and conciseness.

Unknown transport layer security (TLS) traffic that is not identified as being associated with an external services provider, such as Facebook or Google, has been previously reported in a management console only based on the protocol or the protocol version, such as TLS, TLS v.1.2 and so forth. This reporting scheme can cause confusion to a user because it lacks specificity and can result in different services being mistaken for each other, such as when data regarding the TLS traffic is provided in a management report.

The present disclosure pertains to the use of TLS extensions that are included in the "Client Hello" and "Server Hello" messages to gain additional information about the connection. An example of these extensions are the Next Protocol Negotiation extension and the Application Layer Protocol Negotiation extension, both of which provide information on the protocol which is used inside the TLS tunnel. The present disclosure separates the unknown TLS traffic to Web and non-Web traffic, depending whether these extensions reference the protocols HTTP or HTTP/2. For normal browser TLS traffic, these extensions will always be included in the handshake, and they will always reference one or both of these protocols. The absence of these extensions can be used to indicate that the connection is initiated by something else than a web browser, and that the traffic inside the tunnel may be something else than HTTP or HTTP/2. In this manner, additional processing can be performed to identify the type of traffic and to avoid misidentification of the traffic as HTTP or HTTP/2. For example, instead of identifying the traffic purely based on the protocol, such as "web-browsing" (=HTTP) and "SSL" (=TLS), the traffic can be identified based on additional information, such as "Next Protocol Negotiation" (=NPN protocol) and "Application Layer Protocol Negotiation" (=ALPN protocol).

The NPN extension and the ALPN extension are specifically referenced, but the present disclosure is not restricted to these extensions. Signature algorithms can also be used, and are based on the algorithms that the client supports, such that it is possible to deduce certain information of the client. As an example, if the supported algorithms are insecure, it's possible to categorize the connection as insecure. Additional security measurements can then be applied to such connection. The list of the supported algorithms can also explicitly identify the client application in certain cases, which can be used for better categorizing otherwise unknown TLS traffic.

A supported version extension can also be used to identify an insecure connection. If the client only supports old TLS versions, additional security measures can be applied to the connection. Supported groups can be identified in a list of the supported groups, and their order can be used to explicitly identify the client application. RFC 7919 specifies that a client application can support all groups at or above their minimum security threshold. The traffic can be regarded insecure in case this specification is not followed, and additional security measures can be applied to the connection. The group or the key length in a key share extension can be regarded as insecure, in which case an associated connection can be regarded insecure and additional security measures can be applied.

FIG. 1 is a diagram of a system 100 for identifying unknown traffic based on TLS extensions, in accordance with an example embodiment of the present disclosure. System 100 includes traffic identification system 102, client 104, server 106, TLS extension extraction system 108, TLS extension identification system 110, TLS-based security system 112, client hello system 114 and server hello system 116, each of which can be implemented in hardware or a suitable combination of hardware and software.

Traffic identification system 102 can be implemented as one or more algorithms that are configured to be installed on one or more processors to allow the one or more processors to receive data network traffic and process the data network traffic to determine whether transport layer data indicates that additional security should be implemented to protect a network from potentially hostile third parties. In one example embodiment, traffic identification system can receive data from client 104 and server 106, which can be configured to communicate with each other over network 118. In this example embodiment, transport layer data may be required to determine whether additional security is needed, such as when content cannot be determined by source identification or in other suitable manners.

TLS extension extraction system 108 can be implemented as one or more algorithms that are configured to be installed on one or more processors to allow the one or more processors to identify a location of a transport layer security extension and to extract that extension, such as by storing the data in one or more predetermined data storage buffers or other suitable data memory devices. TLS extension extraction system 108 can be configured to process client hello messages, server hello messages or other suitable data to transport layer security extension extraction.

TLS extension identification system 110 can be implemented as one or more algorithms that are configured to be installed on one or more processors to allow the one or more processors perform transport layer security extension identification, such as by processing the transport layer security extension to compare it to known transport layer security data or in other suitable manners. TLS extension identification system 110 can be configured to identify next protocol negotiation data, application layer protocol negotiation data or other suitable data.

TLS-based security system 112 can be implemented as one or more algorithms that are configured to be installed on one or more processors to allow the one or more processors to apply additional system security in response to an identification of a transport layer security extension. In one example embodiment, data network traffic can be identified as potentially hostile if predetermined data is not identified in an associated protocol or in other suitable manners.

Client hello system 114 can be implemented as one or more algorithms that are configured to be installed on one or more processors to allow the one or more processors to generate a client hello data message. In one example embodiment, the client hello data message can include information on the protocol which is used inside the associated transport layer security tunnel or other data that can be used to classify the data being exchanged with a server by the client.

Server hello system 116 can be implemented as one or more algorithms that are configured to be installed on one or more processors to allow the one or more processors to generate a server hello data message. In one example embodiment, the server hello data message can include information on the protocol which is used inside the associated transport layer security tunnel or other data that can be used to classify the data being exchanged with a server by the client.

In operation, system 100 identifies unknown traffic based on TLS extensions by extracting and identifying TLS extensions from client hello and server hello messages, and determines whether to apply additional security in response to the identification. System 100 can be implemented on one or more processors that are adapted to support the associated disclosed systems, such as by using specialized hardware and algorithmic configurations that are not normally provided with a processor.

FIG. 2 is a diagram of an algorithm 200 for identifying unknown traffic based on a response to a client hello, in accordance with an example embodiment of the present disclosure. Algorithm 200 can be implemented in hardware or a suitable combination of hardware and software on one or more processors.

Algorithm 200 can be used for "Unknown TLS" as an element, such as a Network Application element, which has four parameters. The first parameter is "application layer protocols," which can be a list or other suitable data structures. The second parameter is "selected protocol," which can be a string or other suitable data structures. The third parameters is "secure," which can have a Boolean data value or other suitable data structures. The fourth parameters is "suspicious," which can have a Boolean data value or other suitable data structures. The default values for these parameters before additional information has been received can be "application layer protocols"= an empty list, "selected protocol"= an empty string, "secure"=true and "suspicious"=false, or other suitable data structures or values can also or alternatively be used.

These parameters can be populated as the a client hello message or messages are parsed. In this manner, an element can have a state even after only a client hello message has been processed, which allows data security decisions to be made at that stage, such as to terminate an insecure connection before the client hello message is sent to the server, or for other suitable purposes. These parameters also apply to algorithm 300, discussed below.

Algorithm 200 begins at 202, where a client hello message is received. The algorithm then proceeds to 204.

At 204, the algorithm determines whether the client hello includes next protocol negotiation protocol data. If it is determined that the client hello includes next protocol negotiation protocol data, the algorithm then proceeds to 206, otherwise the algorithm proceeds to 208.

At 206, the algorithm adds security values to application layer protocols. In one example embodiment, the security values can be used to verify that client-server communications have not been compromised by a third party, or other suitable procedures can also or alternatively be used. The algorithm then proceeds to 208.

At 208, the algorithm determines whether the client hello includes application layer protocol negotiation protocol data. If it is determined that the client hello includes application layer protocol negotiation protocol data, the algorithm then proceeds to 210, otherwise the algorithm proceeds to 212.

At 210, adds security values to application layer protocols. In one example embodiment, the security values can be used to verify that client-server communications have not been compromised by a third party, or other suitable procedures can also or alternatively be used. The algorithm then proceeds to 212.

At 212, the algorithm determines whether data traffic is secure. If it is determined that data traffic is not secure, the algorithm proceeds to 214, otherwise the algorithm proceeds to 216.

At 214, the algorithm sets a security flag value to equal false. In this manner, a potential security risk associated with the data communications can be identified and data can be logged, re-routed or other suitable procedures can be used. The algorithm then proceeds to 216 and terminates.

In operation, algorithm 200 identifies unknown traffic based on a response to a client hello, such as by determining whether next protocol negotiation data or application layer protocol negotiation data is present and can be used to identify whether the data traffic is secure. Although algorithm 200 is shown as a flow chart algorithm, a person of skill in the art will recognize that the algorithm can be implemented using object-oriented programming, a state diagram, a ladder diagram or in other suitable manners.

Figure 3:
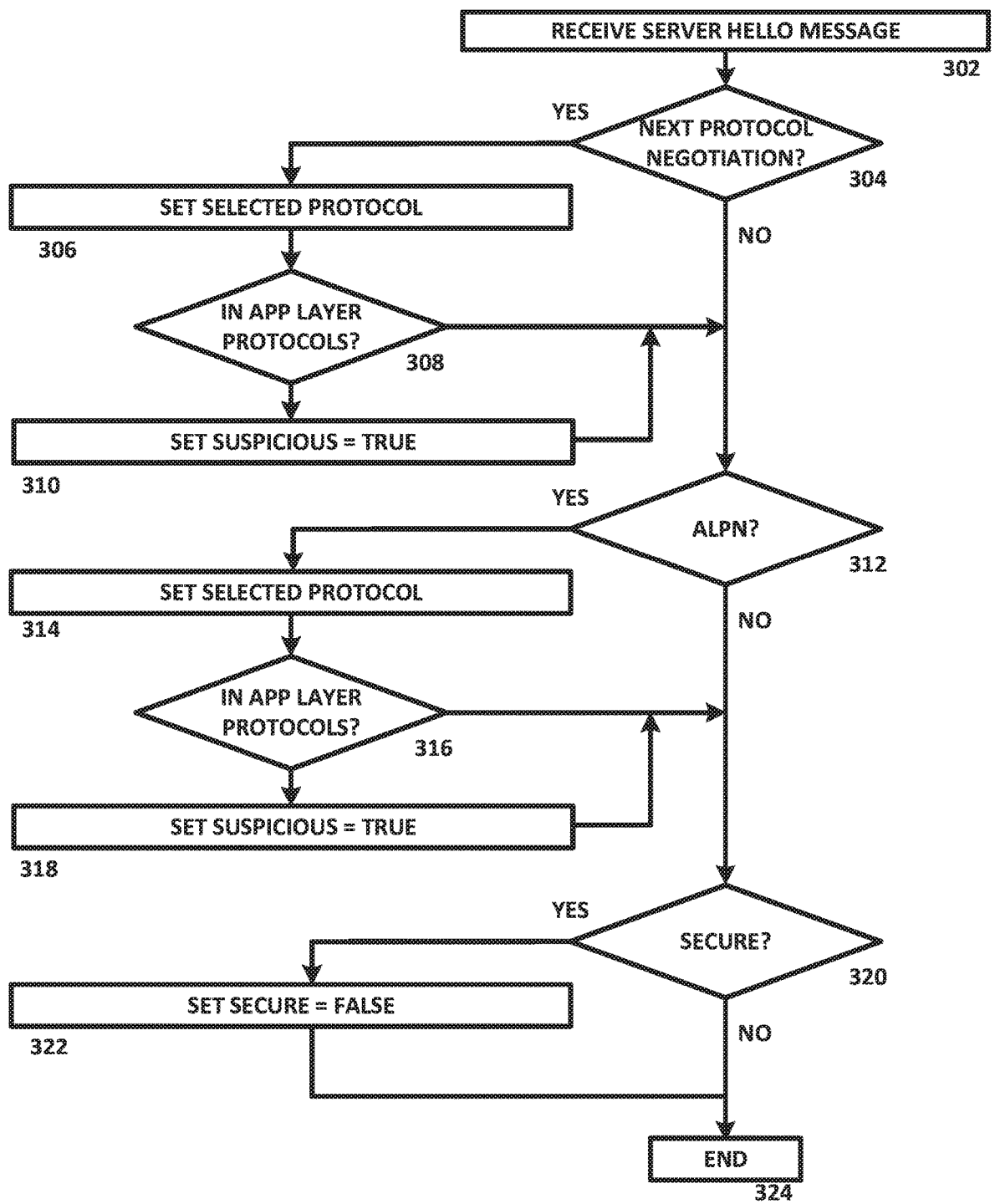
FIG. 3 is a diagram of an algorithm for identifying unknown traffic based on a response to a server hello, in accordance with an example embodiment of the present disclosure.

FIG. 3 is a diagram of an algorithm 300 for identifying unknown traffic based on a response to a server hello, in accordance with an example embodiment of the present disclosure. Algorithm 300 can be implemented in hardware or a suitable combination of hardware and software on one or more processors.

Algorithm 300 begins at 302, where a server hello message is received. The algorithm then proceeds to 304.

At 304, the algorithm determines whether the server hello includes next protocol negotiation protocol data. Consistency with client hello values can also or alternatively be determined. If it is determined that the server hello includes next protocol negotiation protocol data, the algorithm then proceeds to 306, otherwise the algorithm proceeds to 312.

At 306, the algorithm sets a selected protocol. In one example embodiment, the algorithm can set the next protocol negotiation protocol or other suitable protocols can be set. The algorithm then proceeds to 308.

At 308, the algorithm determines whether one or more values have been stored in application layer protocols. In one example embodiment, predetermined data values can be stored in application layer protocols for security purposes, or other suitable data can be stored. Consistency with client hello values can also or alternatively be determined. If it is determined that the values have not been stored, the algorithm proceeds to 310, otherwise the algorithm proceeds to 312.

At 310, a flag is set to indicate that the traffic may be compromised. In one example embodiment, the flag can be a "suspicious" flag that is set to true, or other suitable data values can also or alternatively be set. The algorithm then proceeds to 312.

At 312, the algorithm determines whether the server hello includes application layer negotiation protocol data. Consistency with client hello values can also or alternatively be determined. If it is determined that the server hello includes application layer negotiation protocol data, the algorithm then proceeds to 314, otherwise the algorithm proceeds to 320.

At 314, the algorithm sets a selected protocol. In one example embodiment, the algorithm can set the application layer negotiation protocol or other suitable protocols can be set. The algorithm then proceeds to 316.

At 316, the algorithm determines whether one or more values have been stored in application layer protocols. In one example embodiment, predetermined data values can be stored in application layer protocols for security purposes, or other suitable data can be stored. Consistency with client hello values can also or alternatively be determined. If it is determined that the values have not been stored, the algorithm proceeds to 318, otherwise the algorithm proceeds to 320.

At 318, a flag is set to indicate that the traffic may be compromised. In one example embodiment, the flag can be a "suspicious" flag that is set to true, or other suitable data values can also or alternatively be set. The algorithm then proceeds to 320.

At 320, the algorithm determines whether data traffic is secure. If it is determined that data traffic is not secure, the algorithm proceeds to 322, otherwise the algorithm proceeds to 324.

At 322, the algorithm sets a security flag value to equal false. In this manner, a potential security risk associated with the data communications can be identified and data can be logged, re-routed or other suitable procedures can be used. The algorithm then proceeds to 324 and terminates.

In operation, algorithm 300 identifies unknown traffic based on a response to a server hello, such as by determining whether next protocol negotiation data or application layer protocol negotiation data is present and can be used to identify whether the data traffic is secure. Although algorithm 300 is shown as a flow chart algorithm, a person of skill in the art will recognize that the algorithm can be implemented using object-oriented programming, a state diagram, a ladder diagram or in other suitable manners.

As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items. As used herein, phrases such as "between X and Y" and "between about X and Y" should be interpreted to include X and Y. As used herein, phrases such as "between about X and Y" mean "between about X and about Y." As used herein, phrases such as "from about X to Y" mean "from about X to about Y."

As used herein, "hardware" can include a combination of discrete components, an integrated circuit, an application-specific integrated circuit, a field programmable gate array, or other suitable hardware. As used herein, "software" can include one or more objects, agents, threads, lines of code, subroutines, separate software applications, two or more lines of code or other suitable software structures operating in two or more software applications, on one or more processors (where a processor includes one or more microcomputers or other suitable data processing units, memory devices, input-output devices, displays, data input devices such as a keyboard or a mouse, peripherals such as printers and speakers, associated drivers, control cards, power sources, network devices, docking station devices, or other suitable devices operating under control of software systems in conjunction with the processor or other devices), or other suitable software structures. In one exemplary embodiment, software can include one or more lines of code or other suitable software structures operating in a general purpose software application, such as an operating system, and one or more lines of code or other suitable software structures operating in a specific purpose software application. As used herein, the term "couple" and its cognate terms, such as "couples" and "coupled," can include a physical connection (such as a copper conductor), a virtual connection (such as through randomly assigned memory locations of a data memory device), a logical connection (such as through logical gates of a semiconducting device), other suitable connections, or a suitable combination of such connections. The term "data" can refer to a suitable structure for using, conveying or storing data, such as a data field, a data buffer, a data message having the data value and sender/receiver address data, a control message having the data value and one or more operators that cause the receiving system or component to perform a function using the data, or other suitable hardware or software components for the electronic processing of data.

In general, a software system is a system that operates on a processor to perform predetermined functions in response to predetermined data fields. A software system is typically created as an algorithmic source code by a human programmer, and the source code algorithm is then compiled into a machine language algorithm with the source code algorithm functions, and linked to the specific input/output devices, dynamic link libraries and other specific hardware and software components of a processor, which converts the processor from a general purpose processor into a specific purpose processor. This well-known process for implementing an algorithm using a processor should require no explanation for one of even rudimentary skill in the art. For example, a system can be defined by the function it performs and the data fields that it performs the function on. As used herein, a NAME system, where NAME is typically the name of the general function that is performed by the system, refers to a software system that is configured to operate on a processor and to perform the disclosed function on the disclosed data fields. A system can receive one or more data inputs, such as data fields, user-entered data, control data in response to a user prompt or other suitable data, and can determine an action to take based on an algorithm, such as to proceed to a next algorithmic step if data is received, to repeat a prompt if data is not received, to perform a mathematical operation on two data fields, to sort or display data fields or to perform other suitable well-known algorithmic functions. Unless a specific algorithm is disclosed, then any suitable algorithm that would be known to one of skill in the art for performing the function using the associated data fields is contemplated as falling within the scope of the disclosure. For example, a message system that generates a message that includes a sender address field, a recipient address field and a message field would encompass software operating on a processor that can obtain the sender address field, recipient address field and message field from a suitable system or device of the processor, such as a buffer device or buffer system, can assemble the sender address field, recipient address field and message field into a suitable electronic message format (such as an electronic mail message, a TCP/IP message or any other suitable message format that has a sender address field, a recipient address field and message field), and can transmit the electronic message using electronic messaging systems and devices of the processor over a communications medium, such as a network. One of ordinary skill in the art would be able to provide the specific coding for a specific application based on the foregoing disclosure, which is intended to set forth exemplary embodiments of the present disclosure, and not to provide a tutorial for someone having less than ordinary skill in the art, such as someone who is unfamiliar with programming or processors in a suitable programming language. A specific algorithm for performing a function can be provided in a flow chart form or in other suitable formats, where the data fields and associated functions can be set forth in an exemplary order of operations, where the order can be rearranged as suitable and is not intended to be limiting unless explicitly stated to be limiting.

It should be emphasized that the above-described embodiments are merely examples of possible implementations. Many variations and modifications may be made to the above-described embodiments without departing from the principles of the present disclosure. All such modifications and variations are intended to be included herein within the scope of this disclosure and protected by the following claims.

What is claimed is:

1. A system for providing network data processing, comprising:
    a processor operating one of more algorithms that are configured to interface with one or more clients to receive a client hello data message;
    a transport layer security extension extraction system operating on the processor and configured to extract a protocol negotiation extension from the client hello data message;
    a transport layer security extension identification system operating on the processor and configured to process the protocol negotiation extension from the client hello data message and to identify a data networking session protocol using the protocol negotiation extension; and
    a transport layer security based security system configured to process the protocol negotiation extension from the client hello data message, to identify the data networking session security protocol using the protocol negotiation extension and to modify the data networking session security protocol in response to the identified data networking session security protocol.

2. The system of claim 1 further comprising the processor configured to interface with one or more servers and to receive a server hello data message and to modify the data networking session security protocol in response to the server hello data message.

3. The system of claim 2 further comprising the transport layer security extension extraction system configured to extract an extension from the server hello data message and the processor configured to modify the data networking session security protocol in response to the extracted extension from the server hello data message.

4. The system of claim 3 further comprising the transport layer security extension identification system configured to process the protocol negotiation extension from the server hello data message and to implement a Next Protocol Negotiation.

5. The system of claim 3 further comprising the transport layer security based security system configured to process the protocol negotiation extension from the server hello data message and to identify whether the data networking session is secure using the protocol negotiation extension.

6. The system of claim 1 wherein the processor is configured to determine whether client-server communications have been compromised.

7. The system of claim 1 wherein the processor is configured to set a flag to indicate that client-server communications may have been compromised.

8. The system of claim 1 wherein the processor is configured to set a flag to indicate that client-server communications may have been compromised and to determine whether data traffic is secure if the flag indicates that client-server communications may have been compromised.

9. The system of claim 1 wherein the processor is configured to add security values to application layer protocols.

10. The system of claim 1 wherein the processor is configured to add security values to application layer protocols and to use the security values to verify that client-server communications have not been compromised by a third party.

11. A method for providing network data processing, comprising:
   interfacing with one or more clients to receive a client hello data message using a processor;
   extracting a protocol negotiation extension from the client hello data message using the processor;
   processing the protocol negotiation extension from the client hello data message to identify a data networking session using the protocol negotiation extensions;
   processing the protocol negotiation extension from the client hello data message to identify the data networking session security protocol using the protocol negotiation extension; and
   modifying the data networking session security protocol in response to the identified data networking session security protocol.

12. The method of claim 11 further comprising using the processor to interface with one or more servers and to receive a server hello data message and to determine whether client-server communications have been compromised.

13. The method of claim 12 further comprising extracting the protocol negotiation extension from the server hello data message with the processor.

14. The method of claim 13 further comprising processing the protocol negotiation extension from the server hello data message using the processor to identify the data networking session using the protocol negotiation extension.

15. The method of claim 13 further comprising processing the protocol negotiation extension from the server hello data message with the processor to identify whether the data networking session is secure using the protocol negotiation extension.

16. A method for providing network data processing, comprising:
   interfacing with one or more servers to receive a server hello data message using a processor;
   extracting a protocol negotiation extension from the server hello data message using the processor;
   processing the protocol negotiation extension from the server hello data message to identify a data networking session using the protocol negotiation extension; and
   processing the protocol negotiation extension from the client hello data message, to identify the data networking session security protocol using the protocol negotiation extension; and
   modifying the data networking session security protocol in response to the identified data networking session security protocol.

17. The method of claim 16 further comprising:
   using the processor to interface with one or more clients and to receive a client hello data message;
   determining whether the server hello message and the client hello message are associated with the data networking session.

18. The method of claim 17 further comprising extracting the protocol negotiation extension from the client hello data message with the processor.

19. The method of claim 18 further comprising processing the protocol negotiation extension from the client hello data message using the processor to identify the data networking session using the protocol negotiation extension.

20. The method of claim 18 further comprising processing the protocol negotiation extension from the client hello data message with the processor to identify whether the data networking session is secure using the protocol negotiation extension.

* * * * *

UNITED STATES PATENT AND TRADEMARK OFFICE
CERTIFICATE OF CORRECTION

PATENT NO. : 11,418,542 B2
APPLICATION NO. : 16/750499
DATED : August 16, 2022
INVENTOR(S) : Jenny Anniina Heino et al.

It is certified that error appears in the above-identified patent and that said Letters Patent is hereby corrected as shown below:

In the Claims
1. In Column 8, Line 19, in Claim 1, delete "one of" and insert -- one or --, therefor.
2. In Column 10, Line 13, in Claim 16, delete "extension; and" and insert -- extension; --, therefor.

Signed and Sealed this
Twenty-second Day of November, 2022

*Katherine Kelly Vidal*

Katherine Kelly Vidal
*Director of the United States Patent and Trademark Office*